(12) United States Patent
Butters et al.

(10) Patent No.: US 11,818,247 B2
(45) Date of Patent: *Nov. 14, 2023

(54) SYSTEMS AND METHODS FOR PROVIDING PROVENANCE AND ANTI-COUNTERFEITING OF A PART USING BLOCKCHAIN TECHNOLOGY

(71) Applicant: Honeywell International Inc., Charlotte, NC (US)

(72) Inventors: Lisa Estipona Butters, Phoenix, AZ (US); Sujay Rao, Bangalore (IN); Satyanarayan Kar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,300

(22) Filed: Apr. 7, 2022

(65) Prior Publication Data

US 2022/0231833 A1    Jul. 21, 2022

Related U.S. Application Data

(63) Continuation of application No. 17/071,428, filed on Oct. 15, 2020, now Pat. No. 11,329,804.

(Continued)

(51) Int. Cl.
  *H04L 29/06*       (2006.01)
  *H04L 9/06*        (2006.01)
  (Continued)

(52) U.S. Cl.
  CPC ............ *H04L 9/0637* (2013.01); *G06F 21/31* (2013.01); *G06F 21/73* (2013.01); *H04L 9/0866* (2013.01); *H04L 63/12* (2013.01); *H04L 9/50* (2022.05)

(58) Field of Classification Search
  CPC ..... H04L 9/0637; H04L 9/0866; H04L 63/12; H04L 2209/38; H04L 9/3236; G06F 21/31; G06F 21/73; G06F 16/27; G06Q 30/0185

See application file for complete search history.

(56) References Cited

U.S. PATENT DOCUMENTS

| 6,536,672 B1 | 3/2003 | Outwater |
|---|---|---|
| 10,693,637 B2 | 6/2020 | Ramesh |

(Continued)

FOREIGN PATENT DOCUMENTS

| EP | 3644262 A1 | 4/2020 |
|---|---|---|
| WO | 2017194976 A1 | 11/2017 |

(Continued)

*Primary Examiner* — Mahfuzur Rahman
(74) *Attorney, Agent, or Firm* — Alston & Bird LLP

(57) ABSTRACT

Systems and methods for providing provenance and anti-counterfeiting of a part using blockchain technology are disclosed. One method may include: receiving, through a network, first information of a part associated with a first authentication means on the part from a first user device; verifying, through a blockchain network, the first information of the part via the first authentication means; generating, through the blockchain network, a first block of a blockchain entry for the part based on the verified first information of the part; sending, through the blockchain network, information of a second authentication means associated with the part to the first user device; and publishing, through the blockchain network, the verified first information of the part to the first user device when the first authentication means is activated.

19 Claims, 8 Drawing Sheets

Related U.S. Application Data

(60) Provisional application No. 62/923,435, filed on Oct. 18, 2019.

(51) Int. Cl.
  *G06F 21/31* (2013.01)
  *G06F 21/73* (2013.01)
  *H04L 9/08* (2006.01)
  *H04L 9/40* (2022.01)
  *H04L 9/00* (2022.01)

(56) References Cited

U.S. PATENT DOCUMENTS

| | | |
|---|---|---|
| 10,747,201 B2 | 8/2020 | Biernat et al. |
| 11,004,130 B2 | 5/2021 | Jayachandran |
| 2017/0262862 A1 | 9/2017 | Aljawhari |
| 2018/0174097 A1 | 6/2018 | Liu et al. |
| 2018/0336286 A1 | 11/2018 | Shah |
| 2019/0120929 A1 | 4/2019 | Meadow |
| 2019/0340623 A1 | 11/2019 | Rivkind et al. |
| 2020/0065826 A1* | 2/2020 | Gering ................. G06K 7/1094 |
| 2021/0150205 A1* | 5/2021 | Snyder ..................... H04L 9/50 |
| 2021/0241224 A1* | 8/2021 | Taniguchi .......... G06Q 10/0833 |
| 2022/0231833 A1* | 7/2022 | Butters ................... H04L 63/12 |

FOREIGN PATENT DOCUMENTS

| | | |
|---|---|---|
| WO | 2019100900 A1 | 5/2019 |
| WO | 2020034623 A1 | 2/2020 |
| WO | 2020063185 A1 | 4/2020 |

* cited by examiner

SYSTEMS AND METHODS FOR PROVIDING PROVENANCE AND ANTI-COUNTERFEITING OF A PART USING BLOCKCHAIN TECHNOLOGY

CROSS-REFERENCE TO RELATED APPLICATION(S)

This application is a continuation of and claims the benefit of priority to U.S. application Ser. No. 17/071,428, filed on Oct. 15, 2020, which claims the benefit of priority to U.S. Provisional Patent Application No. 62/923,435, filed Oct. 18, 2019, the entireties of which are incorporated by reference herein.

TECHNICAL FIELD

Various embodiments of the present disclosure relate generally to parts, such as aerospace or vehicle parts, and, more particularly, to systems and methods for providing provenance and anti-counterfeiting of a part.

BACKGROUND

In vehicle industries, such as the aircraft industry, it is important that authentic parts are used in the manufacturing process. For example, aircraft parts may need to be purchased from an authorized distributor to ensure the part is authentic and to prevent counterfeiting. Aerospace original equipment manufacturers (OEMs) have instituted complex process checks to ensure authentic parts are used in the manufacturing process. For example, to ensure authentic parts are being used and/or sold, authorized distributer networks or manual checks on tamper-proof packaging are used to confirm part authenticity. However, authorized distributors must pass intense qualification and on-going audit checks to combat counterfeit activities. These processes are intricate, complex, and time-consuming and require large amounts of manual labor. Further, some current electronic anti-counterfeiting techniques may also be prone to security threats and susceptible to hacking.

The present disclosure is directed to overcoming one or more of these above-referenced challenges.

SUMMARY OF THE DISCLOSURE

In one embodiment, a system is disclosed. The system may include: a memory having processor-readable instructions therein; and one or more processors configured to access the memory and execute the processor-readable instructions, which when executed by the one or more processors configure the one or more processors to perform a plurality of functions, including: receiving, through a network, first information of a part associated with a first authentication means on the part from a first user device; verifying, through a blockchain network, the first information of the part via the first authentication means; generating, through the blockchain network, a first block of a blockchain entry for the part based on the verified first information of the part; sending, through the blockchain network, information of a second authentication means associated with the part to the first user device; and publishing, through the blockchain network, the verified first information of the part to the first user device when the first authentication means is activated.

In another embodiment, a method is disclosed. The method may include: receiving, by one or more processors, through a network, first information of a part associated with a first authentication means on the part from a first user device; verifying, by the one or more processors, through a blockchain network, the first information of the part via the first authentication means; generating, by the one or more processors, through the blockchain network, a first block of a blockchain entry for the part based on the verified first information of the part; sending, by the one or more processors, through the blockchain network, information of a second authentication means associated with the part to the first user device; and publishing, by the one or more processors, through the blockchain network, the verified first information of the part to the first user device when the first authentication means is activated.

In yet another embodiment, a non-transitory computer-readable storage medium is disclosed. The non-transitory computer-readable storage medium may store instructions that, when executed by one or more processors, cause the one or more processors to perform a method of: receiving, through a network, first information of a part associated with a first authentication means on the part from a first user device; verifying, through a blockchain network, the first information of the part via the first authentication means; generating, through the blockchain network, a first block of a blockchain entry for the part based on the verified first information of the part; sending, through the blockchain network, information of a second authentication means associated with the part to the first user device; and publishing, through the blockchain network, the verified first information of the part to the first user device when the first authentication means is activated.

Additional objects and advantages of the disclosed embodiments will be set forth in the description that follows, and will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute embodiments of this specification, illustrate various exemplary embodiments and together with the description, serve to explain the principles of the disclosed embodiments.

DETAILED DESCRIPTION

Figure 1:
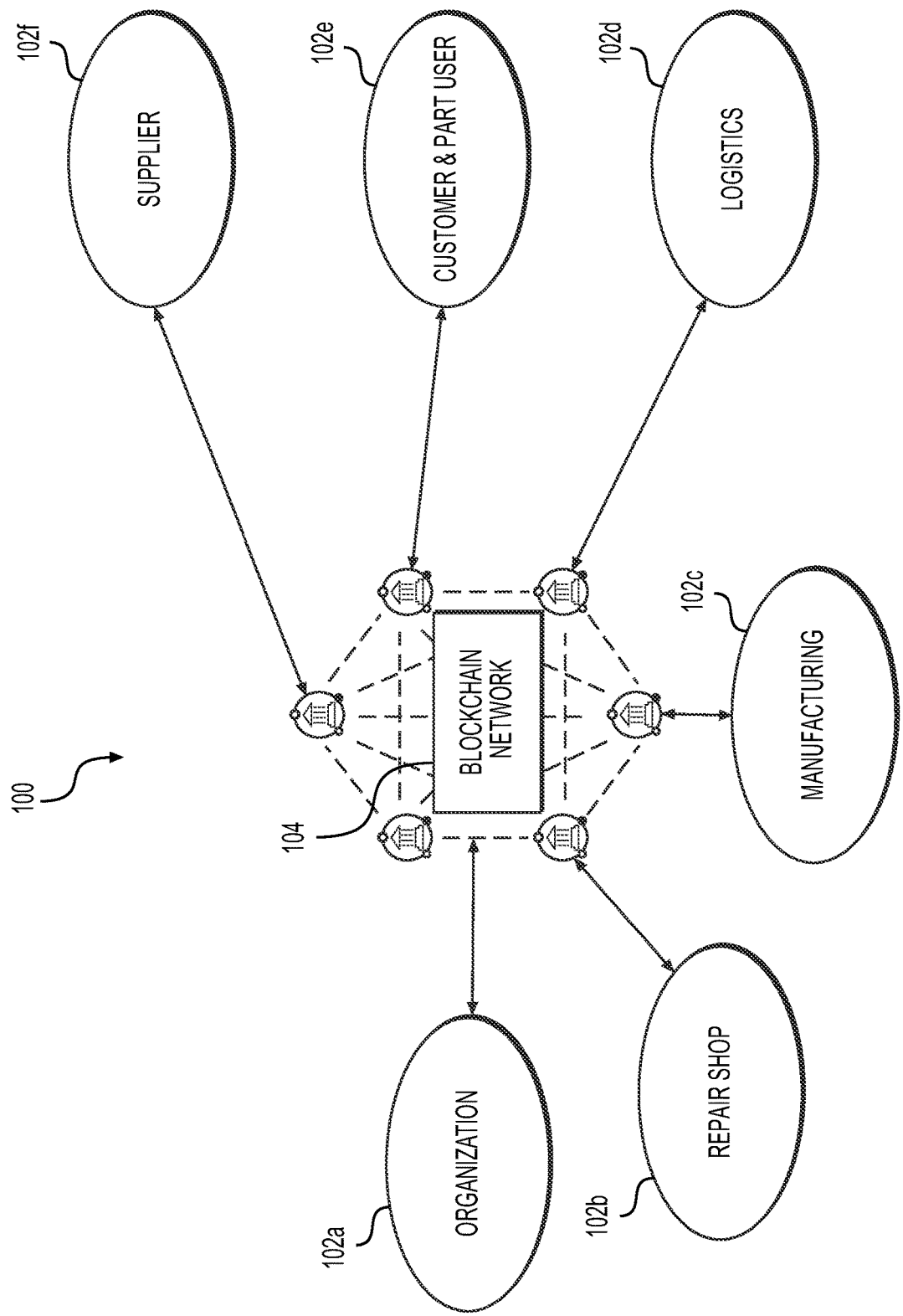
FIG. 1 depicts a block diagram of a system for providing provenance and anti-counterfeiting of a part, according to aspects of the disclosure.

The following embodiments describe systems and methods for providing provenance and anti-counterfeiting of a part. As used herein, "part" may include a physical component or multiple components that form a piece or segment of an apparatus, vehicle, machine, or another component. As such, "part" may include, for example, vehicle parts, vehicles themselves, vehicle part assemblies and sub-assemblies, or any other components of an apparatus, vehicle, machine, or the like. While the exemplary embodiments described herein relate to aerospace parts, "part" may also include any type of vehicle (e.g., automobile, boat, ship, spacecraft, etc.), vehicle parts and components, heavy equipment, heavy equipment parts and components, computing devices, computing device parts and components, or any other manufactured products, components, assemblies, or sub-assemblies.

As described above, it is difficult, time-consuming, and requires complex processes to ensure authenticity of parts, such as aerospace parts. Further, current systems may be susceptible to security risks and/or hacking. Embodiments of the present disclosure provide solutions to these barriers by providing a decentralized blockchain network comprising participants from organizations that produce, repair, or trade the parts. For example, participants may comprise repair shops, manufacturers, customers and parts users, logistics and/or suppliers. Authorized participants verified by the network may interact to authenticate and provide part provenance information using specialized blockchain clients, as described below. The blockchain clients may be operated by users or may be automated through devices. The blockchain may store history information of various parts. For example, the history information may include birth record, first sale to a customer information, part life events information (e.g., ownership changes, installs, removals, for sale listings, repair/overhauls, etc.), and death of the part information. The blockchain network may provide a platform for member organizations to share the history information of the parts. Additionally, the blockchain network may facilitate the generation and identification of an anti-counterfeit mark for each part. The anti-counterfeit mark for each part may include a 2-factor authentication to help ensure authenticity of each part and prevent counterfeiting.

The 2-factor authentication may include a first authentication means and a second authentication means placed on each part. For example, the first authentication means may include a unique unhackable code engraved on each part and the second authentication means may include a special ink applied on each part (e.g., over the engraved unhackable code). As used herein, the "unhackable" code may be an encrypted code, which cannot be duplicated easily when engraved on a part surface, such as a faceplate of the part. The unhackable code may include information stored in a blockchain entry for the part and may be generated and validated by the blockchain network. Thus, the code may be "unhackable" in that information of the code is stored in a distributed blockchain ledger and may not be easily duplicated. The special ink may be an invisible ink applied to the part surface and a characteristic of the special ink may be visible only under a special light. For example, the invisible ink may include a specific, predetermined color and the color of the illuminated ink can vary (e.g., green, red, blue, etc.) with a different composition. The special light may be a device that emits the light with a frequency set by the user. Each frequency may illuminate a different characteristic of the ink (e.g., a different color). The special light may include wireless capabilities to connect to the blockchain network to dynamically receive a predetermined frequency of interest for illuminating the special ink on the part. An application, such as a mobile application on a user device, may provide authentication of the part to the user. For example, the application may use a camera on the user device to scan the unhackable code and connect with the blockchain network to obtain the information of the part. The application may also utilize a location of the user device to geo tag the scanned code.

Accordingly, embodiments of the present disclosure may provide a multi-factor authentication that has both overt and covert features that may be implemented on each part. Further, embodiments may provide a blockchain-enabled process that may help establish legitimacy and provenance of the part and binds the process of anti-counterfeit part marking and tracking of parts from part manufacturing (e.g., birth) to part death (e.g., scrapped). The use of a blockchain network in establishing anti-counterfeit measures and that stores part provenance information may provide a decentralized, distributed ledger. Thus, the systems and methods of the present disclosure may prevent hackers from compromising the system at a single node, thereby providing increased security. Further, the decentralized hardware (e.g., each node) may help prevent collapse due to a single point of failure. Embodiments of the present disclosure may also provide a frictionless user experience by utilizing a mobile application to authenticate the part and automating the entire backend process via the blockchain network.

The subject matter of the present disclosure will now be described more fully hereinafter with reference to the accompanying drawings, which form an embodiment thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in equipment.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a" "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Referring now to the appended drawings, FIG. 1 depicts a block diagram of a system 100 for providing provenance and anti-counterfeiting of a part, according to aspects of the disclosure. As shown in FIG. 1, the system 100 may include organization blockchain nodes 102a-102f in a blockchain network 104. The blockchain nodes 102a-102f may include, for example, a host organization ("organization") 102a, repair shops 102b, manufacturers 102c, logistics 102d, customer and parts users 102e, and suppliers 102f. The nodes 102a-102f may be in communication through a blockchain network 104. Accordingly, the nodes 102a-102f may send and receive data and/or information to and from each other and/or the blockchain network 104.

Figure 4:
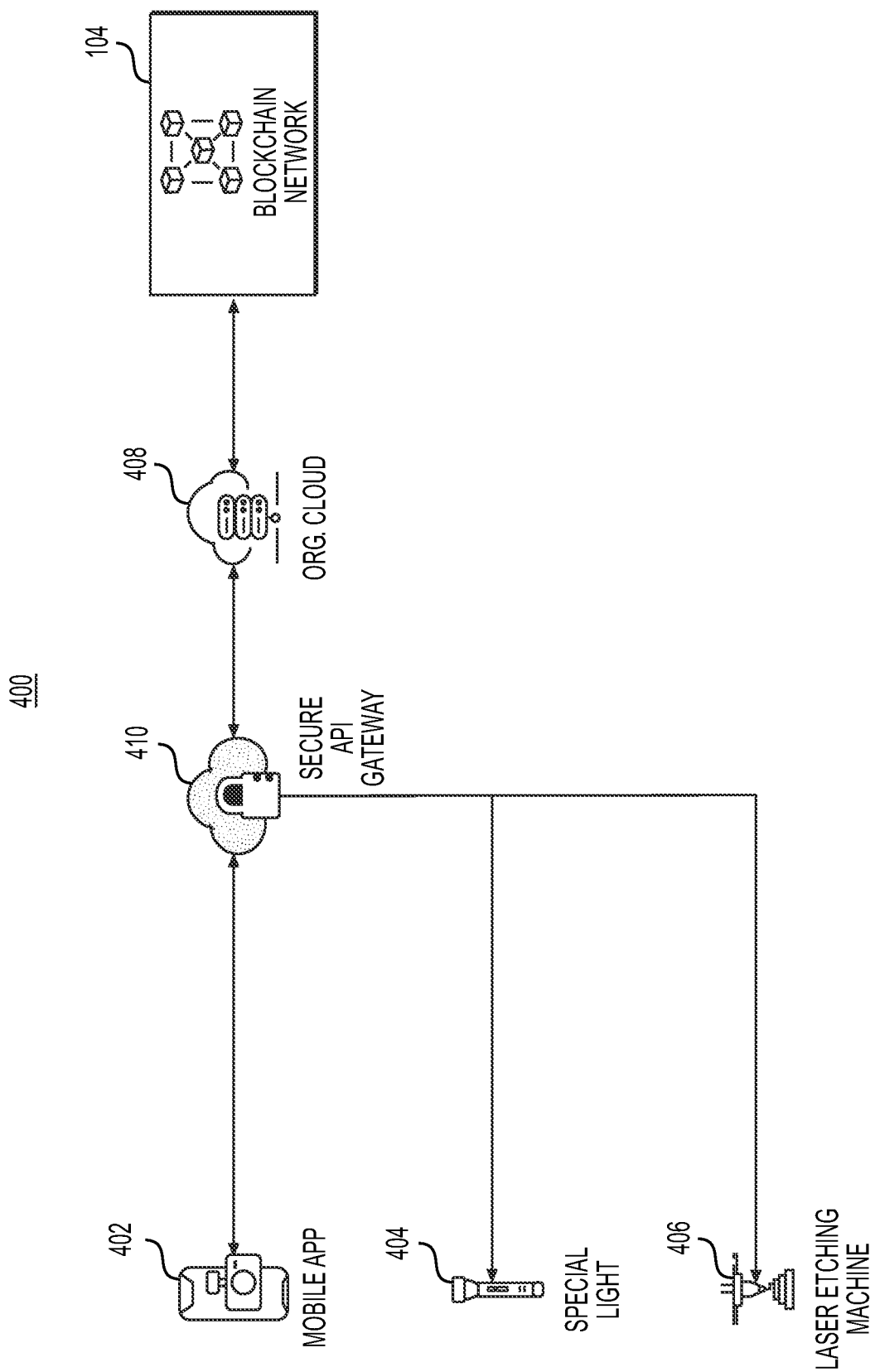
FIG. 4 depicts a high level system diagram of devices used in the system of FIG. 1.

The host organization 102a may include a computer system, such as the system 700 described with respect to FIG. 7 below. As such, the host organization 102a may include one or more processors and a memory for storing and executing applications or software modules of the system 100 of FIG. 1. For example, the computer system of the host organization 102a may include one or more software modules to communicate with user devices and/or other computing devices through a network 408 (as shown in FIG. 4), such as the Internet. Further, the one or more processors may be configured to access the memory and execute processor-readable instructions, which when executed by the processor configures the processor to perform a plurality of functions of the system. For example, the one or more processors may include one or more processors for providing provenance and anti-counterfeiting of a part, as detailed further below.

Figure 2:
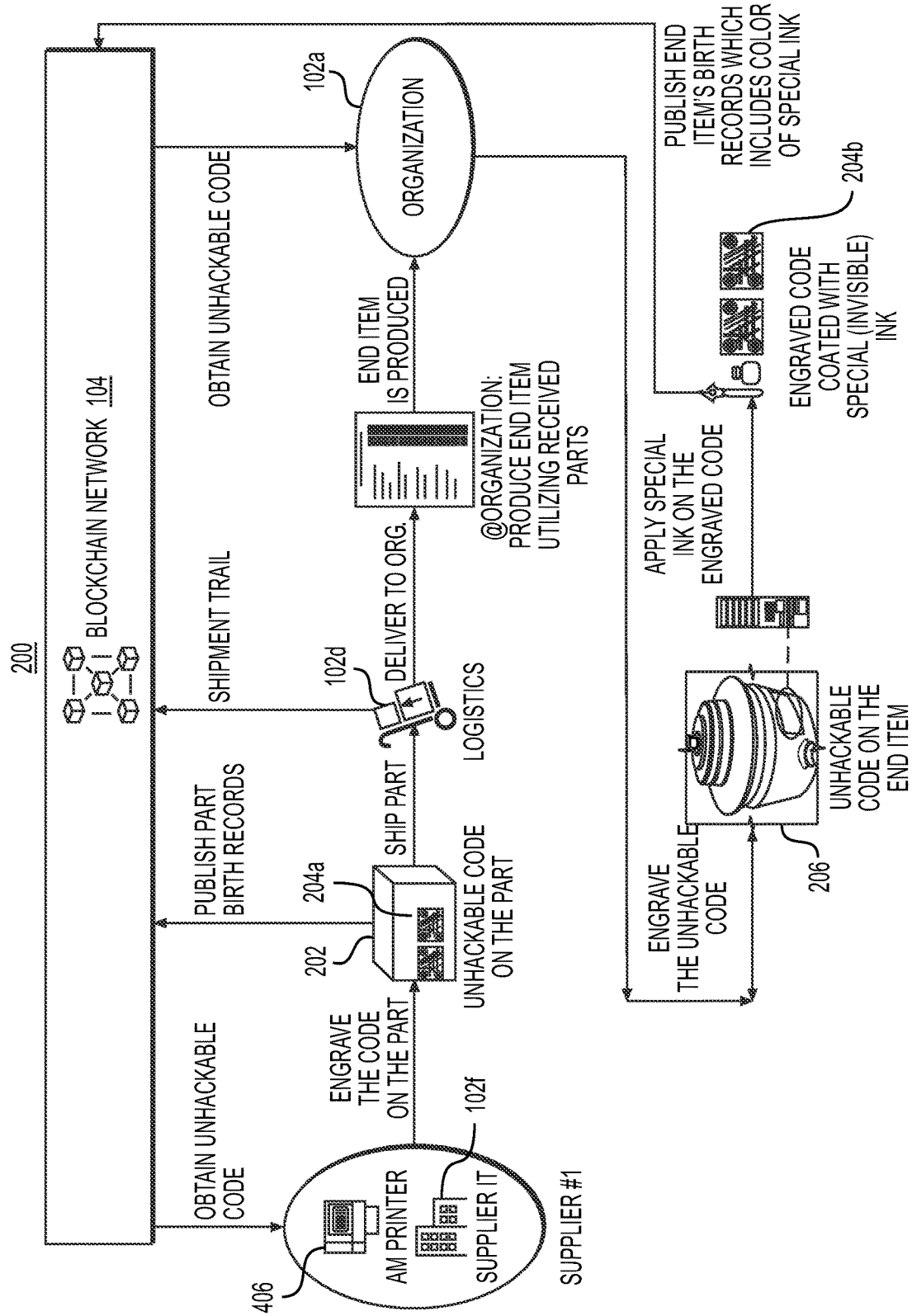
FIG. 2 depicts a diagram of an exemplary process for applying 2-factor authentication during part production using the system of FIG. 1.

FIG. 2 depicts a diagram of an exemplary process 200 for applying two-factor (or "2-factor") authentication during part 202 production using the system 100 of FIG. 1. As shown in FIG. 2, a supplier 102f, such as a part supplier 102f may obtain a first authentication means from the blockchain network 104. The first authentication means may be, for example, a unique unhackable code 204a, such as a QR code. For example, the computer system of the host organization 102a may provide the first authentication means (e.g., the unique code 204a) to a supplier 102f through the blockchain network 104. The processor of the computer system may send, through the blockchain network 104, one or more first unhackable codes 204a to one or more suppliers 102f for placing (e.g., engraving) on one or more parts 202 associated with the one or more suppliers 102f. The supplier 102f may place (e.g., engrave) the first authentication means on the part 202 being produced. The supplier 102f may then publish birth records associated with the part 202 to the blockchain network 104. For example, the supplier 102f may scan the unhackable code 204a and associate the birth records with the scanned code for the part 202. The birth record may include a date of manufacture, location of manufacture, part identification, part serial number, description of the part, part type, or any other information related to the part when it is manufactured. For example, the processor of the computer system may receive, through the blockchain network 104, birth records for each of the one or more parts 202 from the one or more suppliers 102f via the first unhackable code 204a on each respective part 202.

The supplier 102f may then ship the part 202 using a logistics provider 102d, such as a shipping company. The logistics provider 102d may provide updates and a status of the shipment trail to the blockchain network 104. For example, the shipment trail may include a location history and date/time at each location of the part 202 during shipment. The processor of the computer system may receive, through the blockchain network 104, shipment trail history of each respective part 202 being shipped. The one or more parts 202 may be delivered to the host organization 102a and/or the manufacturer 102c for being assembled.

Figure 5A:
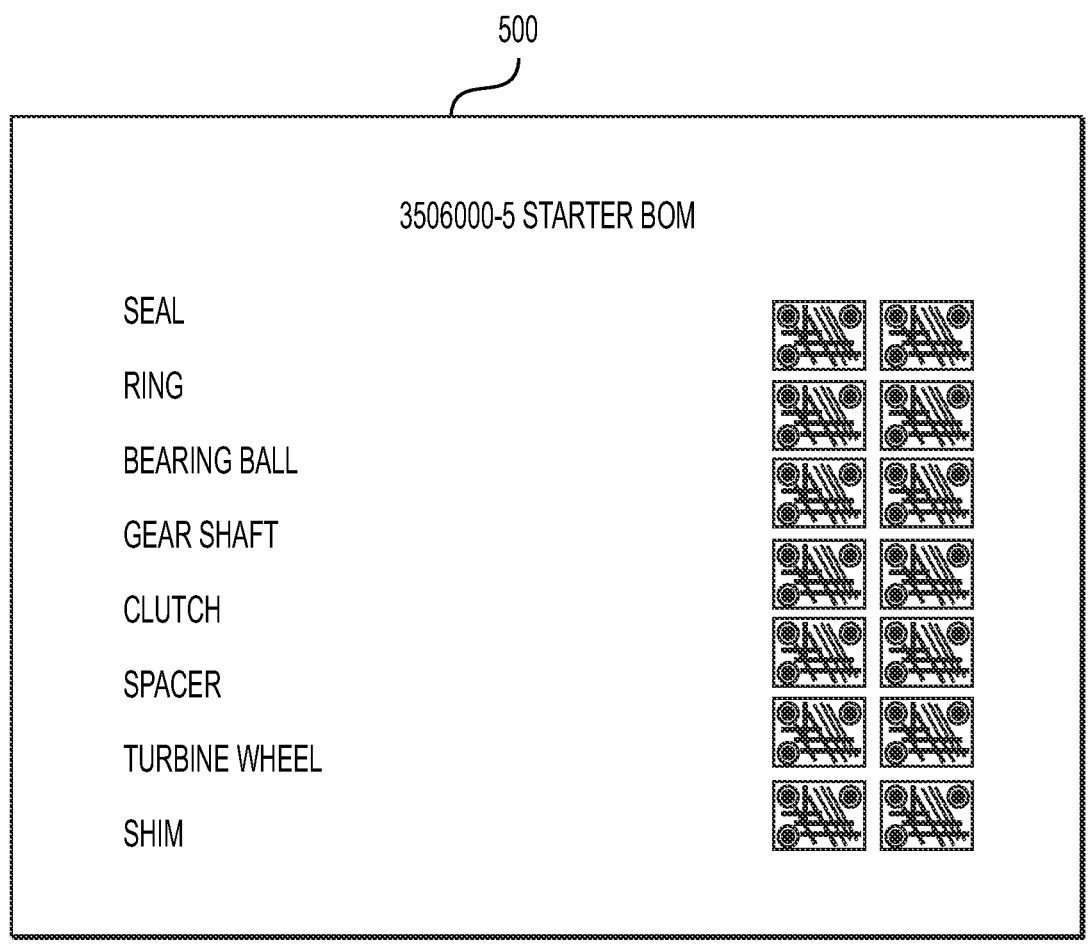
FIGS. 5A and 5B depict exemplary first and second authentication means of the 2-factor authentication used in the system of FIG. 1.

The host organization 102a and/or manufacturer 102c may produce an end item 206 (e.g., another part, assembly, sub-assembly, or the like) using the part 202 and other parts 202 from the supplier 102f and/or other suppliers 102f. Each part 202 of the end item 206 may include a first authentication means (e.g., unique unhackable code 204a). In an exemplary embodiment, the end item 206 may include different parts 202 assembled together to create a larger part 202, 206 for a vehicle (e.g., an aircraft). A list 500 of the parts 202 of the end item 206 and their respective first authentication means may be created and sent to the blockchain network 104. An exemplary list 500 of parts 202 of an end item 206 is shown in FIG. 5A. For example, the parts 202 of the end item 206 may include, a seal, an o-ring, a bearing ball, a gear shaft, a clutch, a spacer, a turbine wheel, a shim, and/or any other parts 202 of the end item 206 and the respective unhackable codes 502 associated with each part 202.

The host organization 102a may then obtain another first authentication means for the end item 206 from the blockchain network 104. For example, the host organization 102a may obtain a second unhackable code 204b to be associated with the end item 206. The processor of the computer system may send, through the blockchain network 104, an unhackable code 204b to the host organization 102a and/or manufacturer 102c for engraving on the end item 206 produced using the one or more parts 202. In one embodiment, the engraved code 204b and publication of the end item's 206 birth may encode and/or otherwise be associated with the unhackable code 204b of any component parts 202, such as the original part 202 provided by the supplier 102f. The host organization 102a may engrave the first authentication means onto a faceplate or other location of the end item 206. The host organization 102a may also apply a second authentication means onto the end item 206. The second authentication means may be, for example, a special ink having a characteristic (e.g., one or more colors) that is illuminated only at a predetermined frequency using a special light 404 (as shown in FIG. 4). The second authentication means may be applied over the first authentication means. The host organization 102a may publish the end item's 206 birth record with the color of the special ink to the blockchain network 104. The processor of the host organization 102a may receive, through the blockchain network 104, the birth record of the end item 206 and the characteristic of the special ink associated with the end item 206. Together, the first and second authentication means may form a 2-factor authentication for the end item 206.

Figure 3:
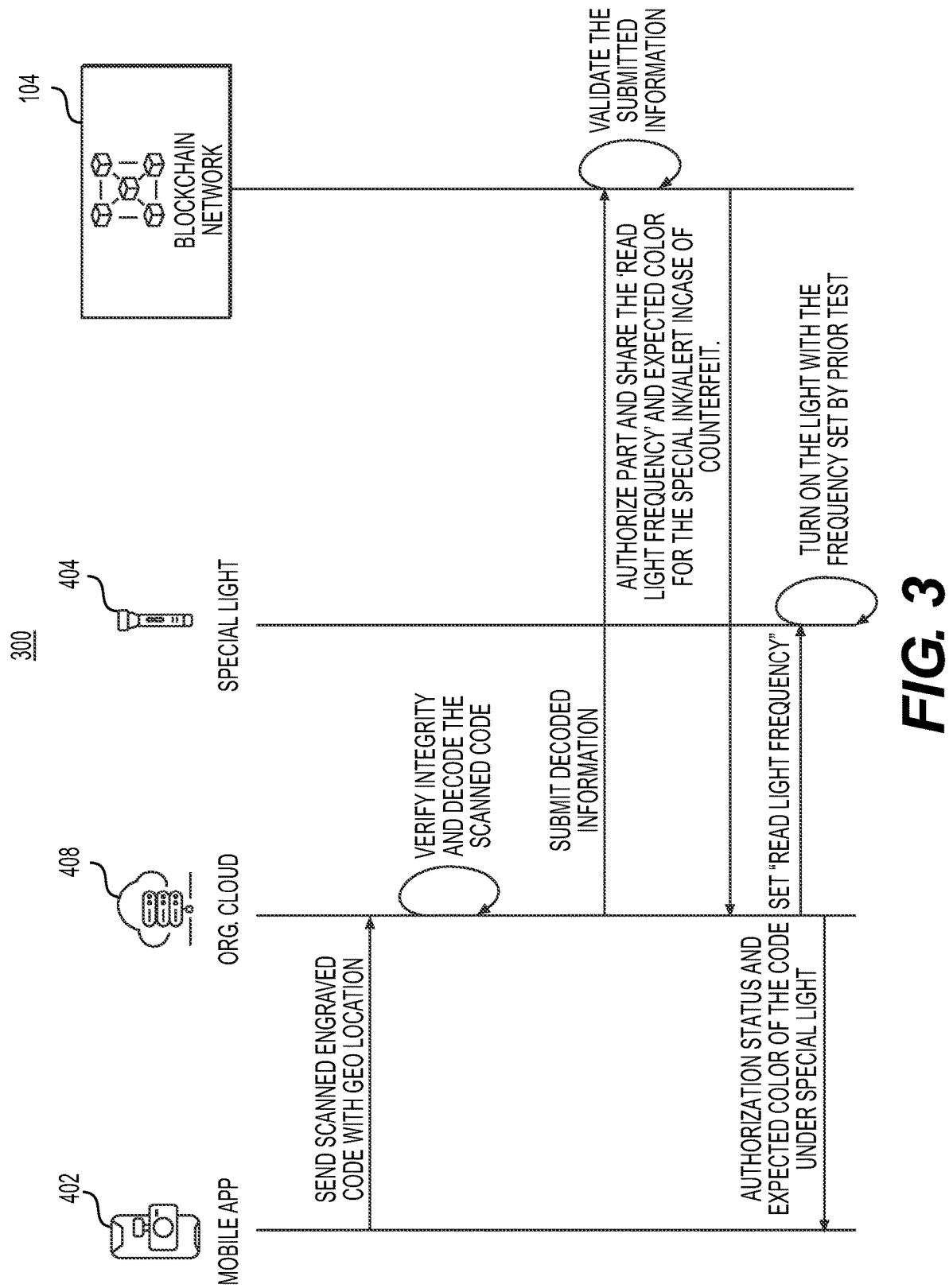
FIG. 3 depicts a diagram of an exemplary process of part identification and legitimation using the system of FIG. 1.

FIG. 3 depicts a diagram of an exemplary process 300 of part identification and legitimation using the system 100 of FIG. 1. FIG. 4 depicts a high level system diagram 400 of devices used in the system 100 of FIG. 1. As shown in FIGS. 3 and 4, the system 400 may include a user device 402, a special light 404, a laser etching machine 406, an organization cloud 408 (e.g., hosted through a network, such as the Internet), a secure application programming interface (API) gateway 410 that sits in front of the organization cloud 408, and the blockchain network 104. The user device 402 may include a computing device, such as a mobile device, laptop, desktop computer, or the like. For example, the user device 402 may include a computer system, such as the system 700 described with respect to FIG. 7 below. The user device 402 may also include a camera and an application, such as a mobile application. The application may be provided by the host organization 102a.

The special light 404 may include a light emitting device that may be set at one or more various frequencies corresponding to that of a special ink printed on a part 202. The special light 404 may therefore be used to illuminate, or reveal, the second authentication means. For example, the one or more frequencies may each correspond to a different characteristic (e.g., a different color, such as red, blue, green, etc.) particular to the special ink such that the characteristic of the special ink is only illuminated at the respective frequency corresponding to the respective characteristic.

Figure 5B:
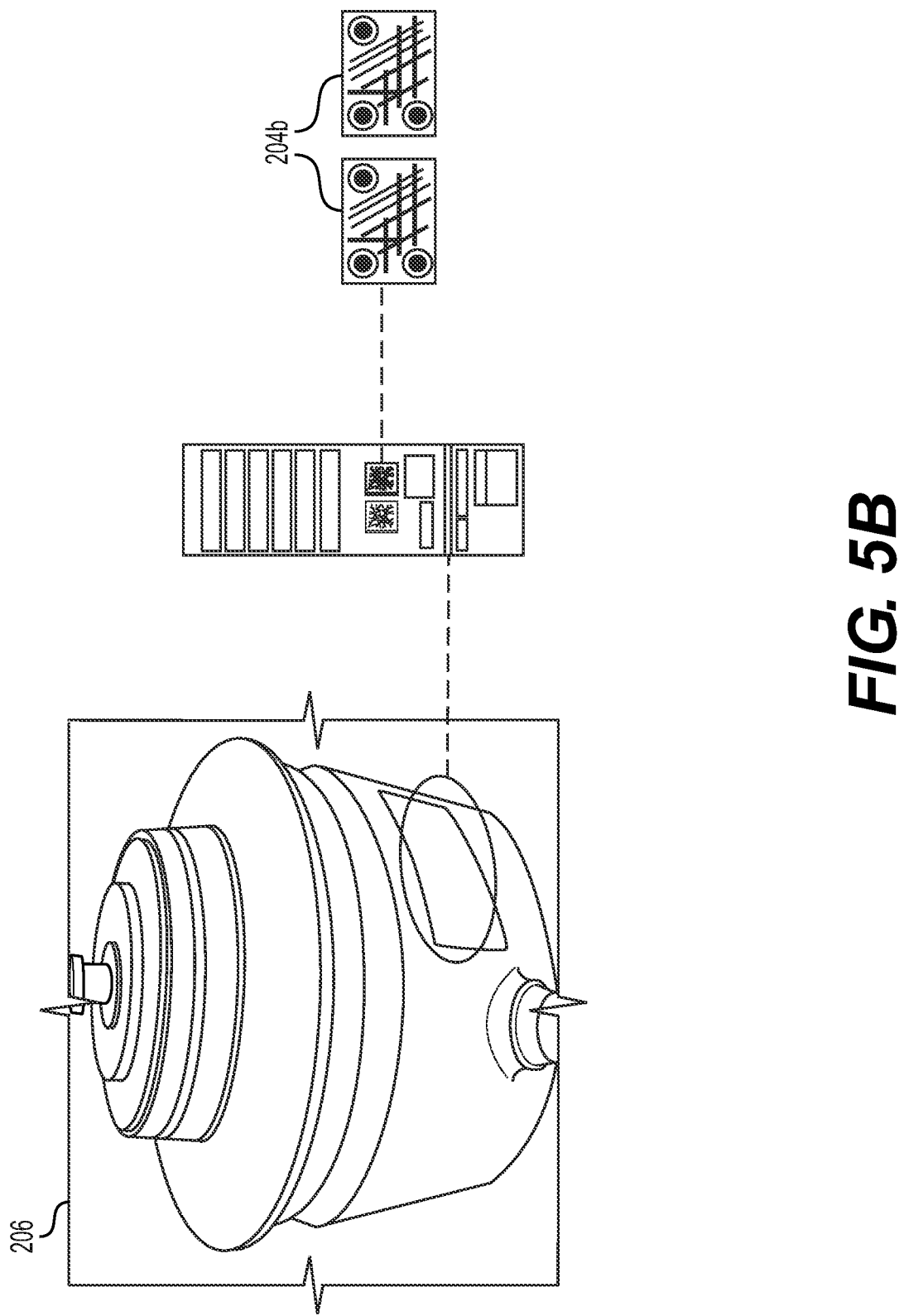

The laser etching machine 406 may be used to engrave the first authentication means onto the part 202. For example, the laser etching machine 406 may engrave a faceplate of the part 202 with the unhackable code 204a, 204b, as shown in FIG. 5B. The unhackable code 204a, 204b may be a unique code for each part 202 and may be associated with information of the part 202. For example, the information of the part 202 may include part name, part identification, part serial number, part type, part description, part birth record (e.g., manufacture date, location, etc.) or any other information of the part 202.

The organization cloud 408 may be a cloud network, hosted over a network, such as the Internet, and may be hosted by the host organization 102a. The organization cloud 408 may include the secure API gateway 410 for acting as a single point of entry for a defined group of microservices. For example, the microservices may include a service for providing provenance and anti-counterfeiting of a part 202. Accordingly, the user device 402, special light 404, and laser etching machine 406 may communicate with the organization cloud 408 via the API gateway 410 through the network.

The blockchain network 104 may include a number of blockchain nodes 102a-102f, as detailed above, for sending and receiving data to and from the blockchain network 104. The blockchain network 104 may be used for providing part provenance and anti-counterfeiting of a part 202, detailed below. The host organization 102a may also provide a service for parts traceability using the blockchain network 104. For example, the parts traceability service may include providing information of the part 202, such as birth record, part provenance, first sale to a customer, part life events (e.g., ownership changes, installs, removals, for sale listings, repairs, overhauls, death of the part, or any other information of the part 202).

The parts traceability service may allow the blockchain clients and nodes 102a-102f to access and add part pedigree information to a blockchain shared ledger. The part pedigree information may track or trace whenever the part 202 goes through a specific event. Events, such as maintenance events, may generate documents that may be properly stored and accessed on the blockchain shared ledger through the blockchain network 104. In the aircraft industry, the part pedigree information may include an aerospace parts pedigree. As such, the parts pedigree information for an aircraft, for example, may include part, serial number, aircraft, event, product image, quality documents, or the like. Events for an aircraft that may generate documents may include, for example, birth, install, repair, re-install, or death/scrap of a part. The event may be recorded by uploading documents, images, or information via an application utilizing a scanning or photo device that may write the document, image, or information to the blockchain shared ledger for each part 202.

The parts traceability service may allow blockchain clients 102a-102f to store such information of the part 202 as a blockchain entry in a shared ledger, such as an immutable distributed part registry. A method of registering parts on the blockchain network 104 may include a first step of receiving the part information from the last owner of the part 202. If this information is not available, a current owner of the part may upload the part information. In one embodiment, the part information may include up-to-date certified release forms and an image of the part 202. For aircraft, for example, the server may receive up-to-date certified release forms, such as FAA Form 8130. The certified release forms may be certified by a government entity, such as the Federal Aviation Administration (FAA), and may authorize the part 202 to be used on, for example, a vehicle. For vehicle parts or aerospace parts, for example, the certified release forms may contain information of the part, such as description, part number, serial number, status of the part 202, manufacturing information, safe condition information, and other information about the part that may be certified by the government entity. The server may also receive an image of the part 202 from the user. For aircraft, for example, the image may be of a faceplate for a part 202 and may contain information of the part 202, such as part number, serial number, manufacturer, or other relevant information of the part 202.

With reference to FIG. 3, the processor of the computer system of the host organization 102a may receive the scanned first authentication means (e.g., scanned engraved unhackable code) of the part 202 from the user device 402 through a network (e.g., the cloud 408). For example, a user may use the user device 402 to scan the first authentication means (e.g., the unhackable code 204a, 204b) of a part 202 with the camera using the application. The user device 402 can then send the scanned first authentication means to the host organization 102a, for example, via the cloud 408. The user device 402 can also send a geo location of the user device 402 to the host organization 102a. As such, the part 202 may be geo tagged when the first authentication means is scanned. Accordingly, the host organization 102a may verify the integrity of the first authentication means and may decode the first authentication means. For example, the processor of the computer system may verify the integrity of the received engraved code 204a, 204b of the part 202 and may decode the received engraved code 204a, 204b of the part 202. The host organization 102a may then submit the decoded information to the blockchain network 104. For example, the processor of the computer system may send the decoded engraved code 204a, 204b to the blockchain network 104 for validating the decoded engraved code 204a, 204b.

The blockchain network 104 may authorize the part 202 and share the "read light frequency" and expected characteristic (e.g., color) of the special ink to the host organization 102a. The "read light frequency" may be a predetermined frequency setting for the special light 404 to illuminate the special ink on the part 202 (e.g., the second authentication means). Accordingly, the processor of the computer system may receive validation of the engraved code 204a, 204b, the predetermined light frequency, and an authorization status (e.g., a status that the part 202 is authorized or not authorized) for the part 202 from the blockchain network 104. The host organization 102a may send the authorization status, the expected characteristic of the special ink, and the "read light frequency" to the user device 402. For example, the processor of the computer system may send the authorization status, the expected characteristic of the special ink, and the predetermined light frequency to the user device 402. The user may set the special light 404 to the predetermined light frequency to illuminate the special ink. If the expected characteristic of the special ink is illuminated, the part 202 is authentic (i.e., the part passed the 2-factor authentication). Accordingly, the 2-factor authentication (e.g., the first authentication means and the second authentication means) may provide anti-counterfeiting of the part 202.

Further, when the user uses the user device 402 to scan the first authentication means, information of the part 202 may be displayed on the user device 402 (e.g., via the application). For example, the parts traceability service of the host organization 102a may display the birth record, part provenance, first sale to a customer, and/or any part life events for the part 202 when the unhackable code 204a, 204b is scanned. Accordingly, the processor of the computer system may provide part provenance information when the first authentication means is activated (e.g., the unhackable code 204a, 204b is scanned).

Figure 6:
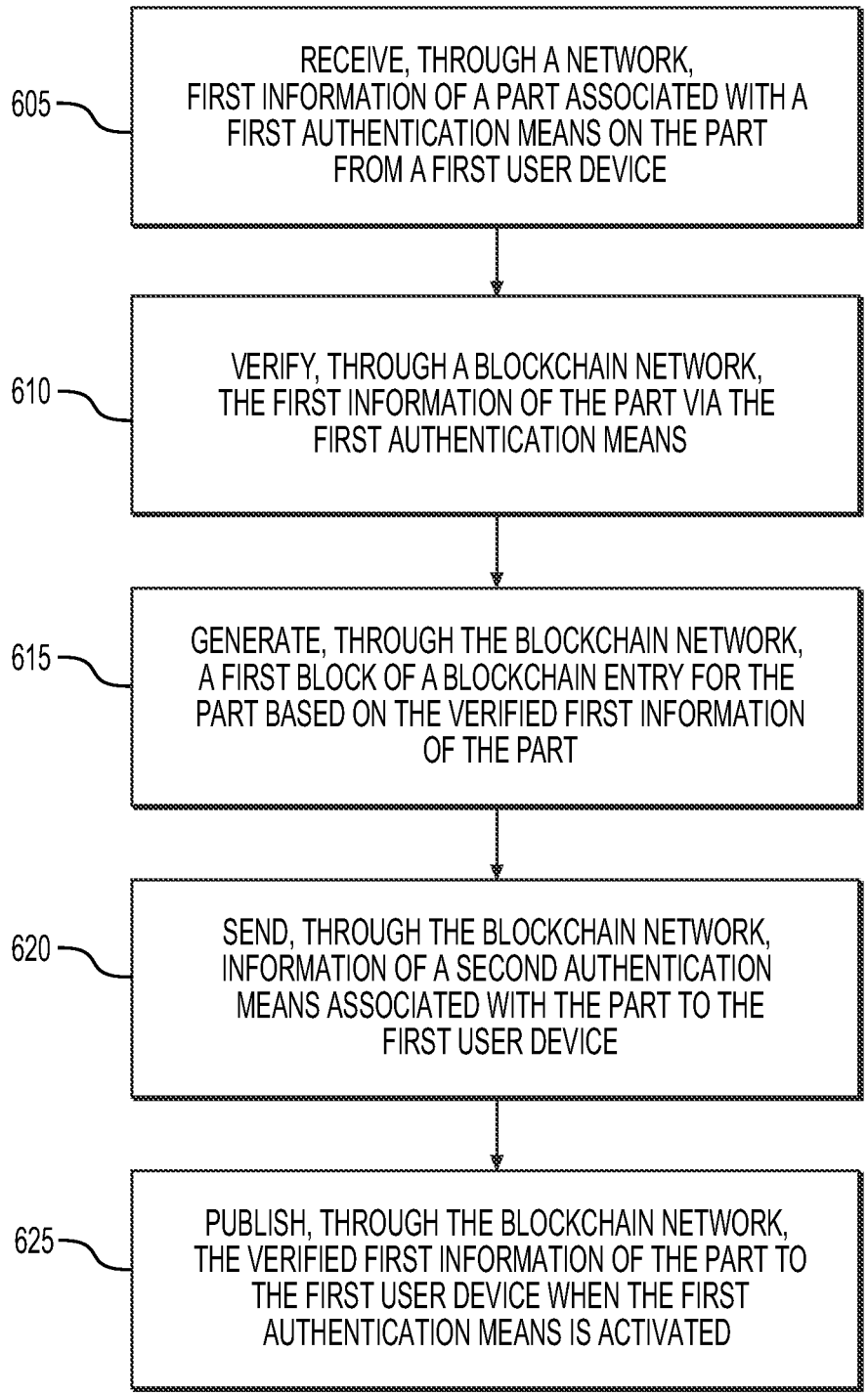
FIG. 6 depicts a flow diagram of an exemplary embodiment of a method for providing provenance and anti-counterfeiting of a part.

FIG. 6 depicts a flow diagram of an exemplary embodiment of a method 600 for providing provenance and anti-counterfeiting of a part. In an initial step 605, one or more processors of the computer system of the host organization 102a may receive, through a network 408, first information of the part 202 associated with the first authentication means on the part 202 from a first user device 402. As detailed above, the first authentication means may include a code 204a, 204b engraved on the part.

In step 610, the one or more processors of the computer system may verify, via the blockchain network 104, the first information of the part 202 via the received first authentication means. For example, a supplier 102f may scan the first authentication means using first user device 402 and send birth records of the part 202 to the host organization 102a.

In step 615, the one or more processors of the computer system may generate a first block of a blockchain entry for the part 202 with the verified first information of the part 202 via the blockchain network 104.

In step 620, the one or more processors of the computer system may send, through the blockchain network 104, information of a second authentication means associated with the part 202 to the first user device 402. For example, the host organization 102a may receive the information of the second authentication means and send the information of the second authentication means to the first user device 402. The supplier may then apply the second authentication means to the part 202.

In step 620, the processor of the computer system may publish, through the blockchain network 104, the verified first information of the part to the first user device 402 when the first authentication means is activated. For example, when the first authentication means is activated by a respective user device 402 (e.g., associated with any of the nodes 102a-102f), the verified first information may be published to the respective user device 402. Thus, any node 102a-102f may view the information of the part 202 in the blockchain entry and/or may add a new block of information of the part to the blockchain entry.

In some embodiments, the one or more processors of the computer system may receive, through the network 408, second information of the part associated with the first authentication means on the part 202 from a second user device 402. For example, a logistics provider 102d may scan the first authentication means on the part 202 and send shipment trail information to the host organization 102a using the second user device 402. The one or more processors of the computer system may then verify, via the blockchain network 104, the second information of the part 202 via the received first authentication means. Upon verification, the one or more processors may generate a second block of the blockchain entry for the part with the verified second information of the part via the blockchain network 104.

In some embodiments, the one or more processors of the computer system may receive, through the network 408, information of the first authentication means from a third user device 402. For example, a customer or part user 102e may scan the first authentication means on the part 202 and send the scanned information to the host organization 102a using the third user device 402. The one or more processors may verify the information of the first authentication means and send the verified first authentication means to the blockchain network 104 for validating the authentication means. Upon validation of the first authentication means from the blockchain network 104, the one or more processors may receive the second authentication means from the blockchain network 104. The one or more processors may then send the second authentication means to the third user device 402. The second authentication means may include a characteristic (e.g., a color) of an ink on the part 202 and may include a predetermined light frequency for illuminating the ink. The customer or part user 102*e* may tune a light 404 to the predetermined light frequency and illuminate the ink, thus verifying authenticity and validity of the part 202. In some embodiments, the one or more processors may also publish, or otherwise send, the first and second information of the part 202 in the blockchain entry to the third user device 402. Thus, the customer or parts user 102*e* may view part provenance and history information of the part 202.

Figure 7:
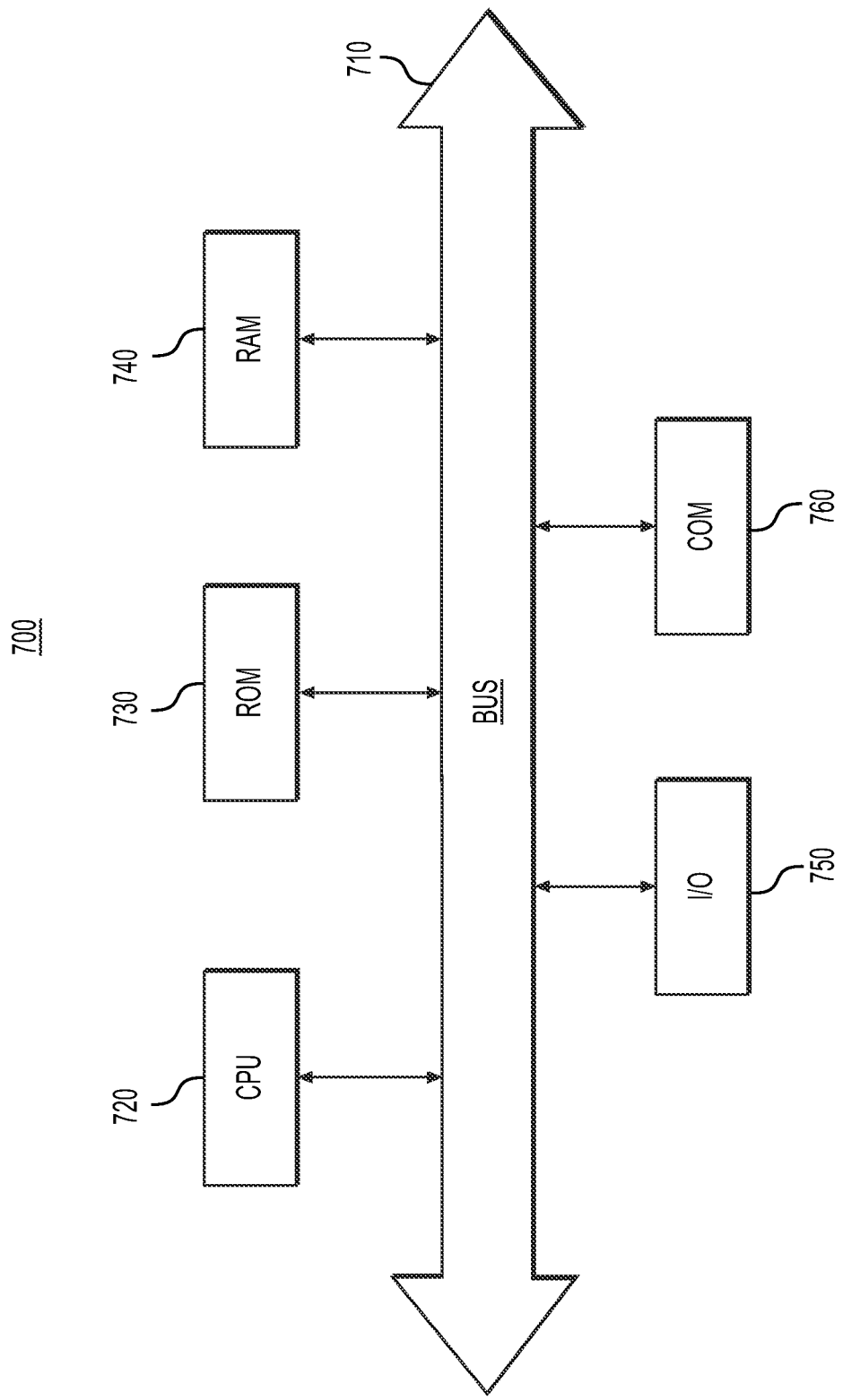
FIG. 7 depicts an example system that may execute techniques presented herein.

FIG. 7 depicts an example system 700 that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform also may include a central processing unit ("CPU") 720, in the form of one or more processors, for executing program instructions. The platform may include an internal communication bus 710, and the platform also may include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed above should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc.

Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A system, comprising:
   a memory having processor-readable instructions therein; and
   one or more processors configured to access the memory and execute the processor-readable instructions, which when executed by the one or more processors configure the one or more processors to perform a plurality of functions, including:
   receiving, through a network, one or more of first information of a part associated with a first authentication marking on the part or second information of the part associated with a second authentication marking on the part;
   verifying, through a blockchain network, one or more of the first information of the part via the first authentication marking on the part or the second information of the part via the second authentication marking on the part; and
   generating, through the blockchain network, a first block of a blockchain entry for the part based on one or more of the verified first information of the part or the verified second information of the part,
   wherein the first authentication marking provides overt features for multi-factor authentication of the part and the second authentication marking provides covert features for multi-factor authentication of the part.

2. The system of claim 1, wherein the plurality of functions further include:

sending, through the blockchain network, the second information of the second authentication marking associated with the part to a first user device;
publishing, through the blockchain network, the verified first information of the part to the first user device when the first authentication marking is activated;
receiving, through the network, second information of the part associated with the first authentication marking on the part from a second user device;
verifying, through the blockchain network, the second information of the part via the first authentication marking; and
generating, through the blockchain network, a second block of the blockchain entry for the part based on the verified second information of the part.

3. The system of claim 2, wherein the plurality of functions further include:
   receiving, through the network, information of the first authentication marking from a third user device;
   verifying the information of the first authentication marking;
   sending the verified information of the first authentication marking to the blockchain network for validating the first authentication marking;
   upon validation of the first authentication marking from the blockchain network, receiving, from the blockchain network, the second authentication marking; and
   sending the second authentication marking to the third user device.

4. The system of claim 3, wherein the plurality of functions further include:
   upon validation of the first authentication marking from the blockchain network, publishing the first and second information of the part in the blockchain entry to the third user device.

5. The system of claim 3, wherein the first authentication marking includes one or more of (1) a code engraved on the part or (2) a characteristic of an ink on the part and a predetermined light frequency for illuminating the ink.

6. The system of claim 3, wherein the second authentication marking includes one or more of (1) a code engraved on the part or (2) a characteristic of an ink on the part and a predetermined light frequency for illuminating the ink.

7. The system of claim 3, wherein each of the first and second information of the part in the blockchain entry includes at least one of a birth record of the part, part provenance, or part life events.

8. A system, comprising:
   a memory having processor-readable instructions therein; and
   one or more processors configured to access the memory and execute the processor-readable instructions, which when executed by the one or more processors configure the one or more processors to perform a plurality of functions, including:
   engraving a first unique code onto a component;
   associating information of the component with the engraved first unique code to a blockchain network;
   producing an assembly including the engraved component;
   applying an ink associated with a second unique code onto the assembly, wherein the second unique code is associated with the first unique code;
   associating information of the assembly with the applied ink to the blockchain network;

receiving, through a network, the information of the assembly associated with the second unique code on the assembly; and verifying, through the blockchain network, the information of the assembly via the second unique code on the assembly, wherein the first unique code provides overt features for multi-factor authentication of the component and the second unique code provides covert features for multi-factor authentication of the assembly.

9. The system of claim 8, wherein the ink has a color that is illuminated only at a predetermined frequency using a special light for illuminating the ink.

10. The system of claim 8, wherein the ink is applied over the engraved first unique code.

11. The system of claim 8, wherein the engraving is laser etching.

12. A method comprising:

engraving a first unique code onto a part;

associating first information of the part with the engraved first unique code to a blockchain network;

applying an ink associated with a second unique code onto the part, wherein the second unique code is associated with the first unique code; and associating second information of the part with the applied ink to the blockchain network, wherein the first unique code provides overt features for multi-factor authentication of the part and the second unique code provides covert features for multi-factor authentication of the part.

13. The method of claim 12, wherein the ink has a color that is illuminated only at a predetermined frequency using a special light for illuminating the ink.

14. The method of claim 13, wherein the predetermined frequency illuminates the color of the ink, and different frequencies of light illuminate different characteristics, and therefore different colors, of the ink.

15. The method of claim 12, wherein the ink is applied over the engraved first unique code.

16. The method of claim 12, wherein the engraving is laser etching.

17. The method of claim 12, wherein one or more of the first unique code and the second unique code is an encrypted code.

18. The method of claim 12, wherein the part is an assembly of multiple components, wherein each component of the multiple components includes a unique code of the component, and one or more of the associated first information and the second information of the part as the assembly includes the unique code of each component of the multiple components of the assembly.

19. The method of claim 12, wherein the first unique code is engraved on a faceplate of the part.

* * * * *